United States Patent [19]

Olson

[11] 4,202,106
[45] May 13, 1980

[54] BOLT PATTERN GAUGE

[76] Inventor: James D. Olson, 831 Island Way, Clearwater, Fla. 33515

[21] Appl. No.: 788

[22] Filed: Jan. 3, 1979

[51] Int. Cl.² .......................... G01B 3/30; G01B 3/48
[52] U.S. Cl. .................................................... 33/168 R
[58] Field of Search ............ 33/143 R, 143 D, 168 R, 33/168 B, 180 AT, 181 AT, 143 H

[56] References Cited

U.S. PATENT DOCUMENTS

| 3,016,618 | 1/1962 | Speed et al. | 33/168 B X |
| 4,138,820 | 2/1979 | O'Connor | 33/168 R |

FOREIGN PATENT DOCUMENTS

| 237912 | 5/1964 | Austria | 33/168 R |
| 465894 | 1/1969 | Switzerland | 33/143 R |

*Primary Examiner*—Charles E. Phillips
*Attorney, Agent, or Firm*—Clarence A. O'Brien; Harvey B. Jacobson

[57] ABSTRACT

The gauge has a plurality of laterally spaced pairs of hollowed frustrums. Each pair of frustrums is spaced in accordance with the distance between the lugs comprising standard lug patterns on existing hubs and wheels of automobiles. The hollowed frustrums may be placed over adjacent lugs on the hub of an automobile to determine the actual spacing therebetween. Furthermore, the frustrums may be inserted in adjacent openings in automobile wheels to determine that spacing and thereby enable the user to match a wheel to the hub upon which it fits.

10 Claims, 6 Drawing Figures

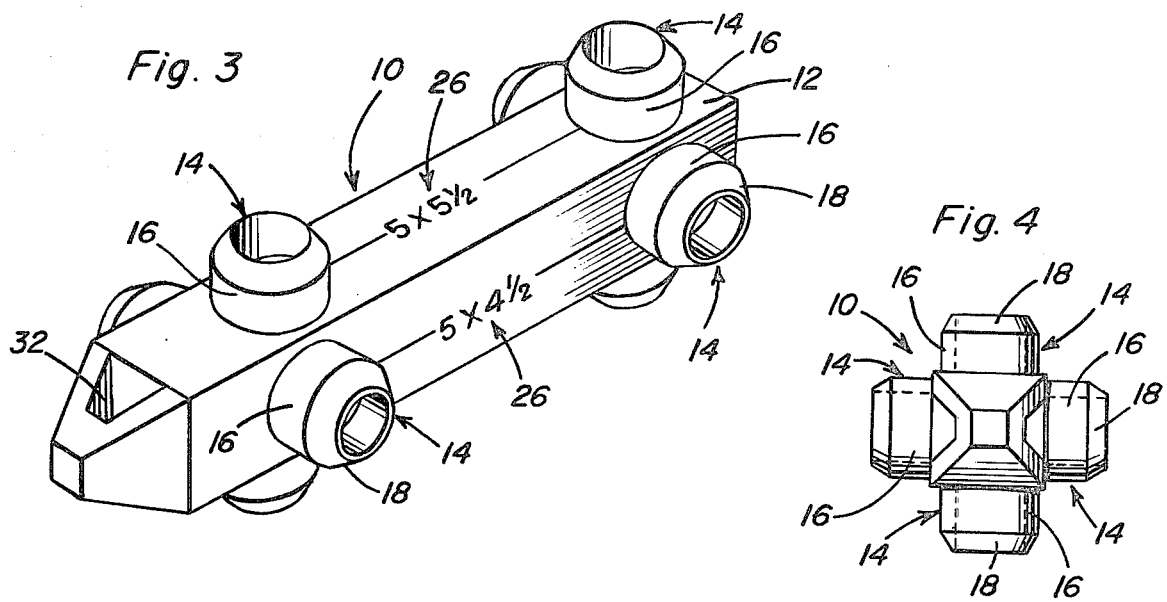
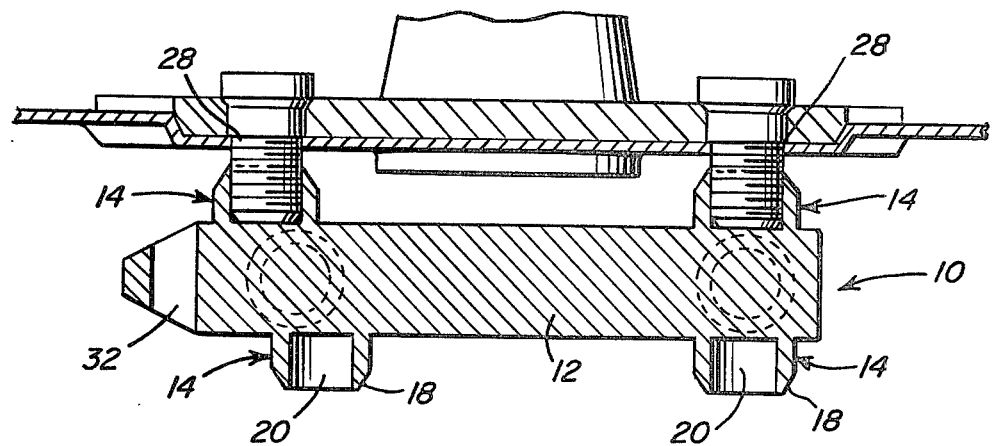
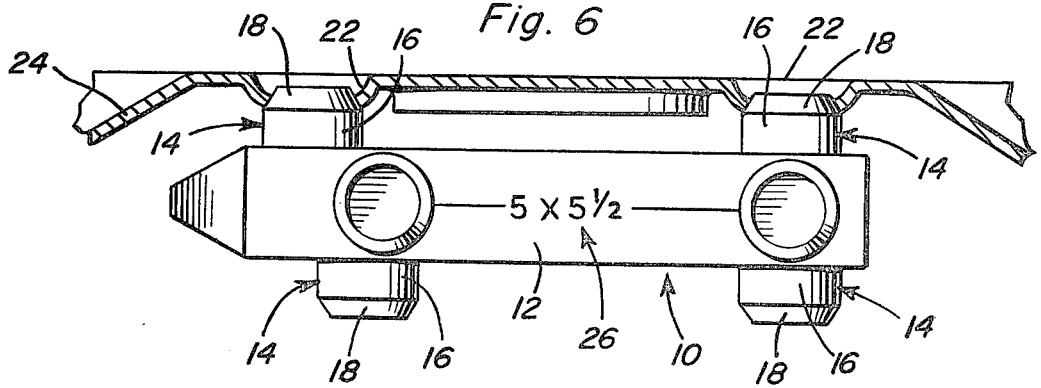

BOLT PATTERN GAUGE

BACKGROUND OF THE INVENTION

1. Field of the Invention

This invention relates to gauges and more particularly to gauges used in determining fixed distances between elements.

2. Description of the Prior Art

The bolts which are used to attach a wheel to an automobile are spaced at equal intervals along the circumference of a circle having a specified diameter. This circle is known as the bolt circle. If, for example, a bolt circle has a diameter of 4¾ inches and contains five bolts, the designation 5 on 4¾ or 5×4¾ is applied to it. Naturally, a wheel having a bolt circle of 5 on 4¾, for example, must be used on a hub having a bolt circle which is also 5 on 4¾.

Identifying the bolt circles of automobile wheels and the attaching studs on the automobile hub has become an almost impossible task due to the large number of different bolt circles used on modern automobiles. Many businesses need to identify these bolt circles quickly and easily. Therefore, a simple bolt pattern gauge is needed to quickly and easily identify the bolt circle on a given hub or wheel.

Existing, known fixed length gauges, such as that shown in U.S. Pat. No. 1,170,255, issued Feb. 1, 1916, to Hess, are not up to the task at hand. The Hess gauge provides contact surfaces at opposite ends of an elongated body for measuring the distance between parallel planar surfaces.

SUMMARY OF THE INVENTION

A primary object of the present invention is to identify the bolt circle designation for wheel mounting studs on an automobile, and the like, and also determine the bolt circle designation for wheels to be mounted on those studs by measuring the distance between adjacent studs or adjacent mounting holes of the wheels.

In accordance with the primary object, a further object of the present invention is to provide a gauge with a main body having lateral extensions which can fit over adjacent studs or fit within adjacent mounting holes to designate studs and holes having like bolt circle designations.

A further object of the present invention is to provide a gauge wherein the extensions are configured as hollowed frustrums such that the hollowed portion of adjacent frustrums may fit over adjacent studs and the external surface of the frustrums may fit within adjacent mounting holes.

Yet a still further object of the present invention is to provide a bolt pattern gauge which has a body which can accept a plurality of pairs of hollowed frustrum shaped extensions so that the gauge may be used to identify a plurality of different bolt circles.

Another object of the present invention is to provide a bolt pattern gauge which has formed unitarily therewith an aperture for hanging the gauge for convenient access thereto.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a perspective view of the bolt gauge.

FIG. 4 is an end view of the bolt gauge.

FIG. 5 is a sectional view taken substantially along a plane passing through section line 5—5 of FIG. 1.

FIG. 6 is a sectional view taken substantially along a plane passing through section line 6—6 of FIG. 2.

DESCRIPTION OF THE PREFERRED EMBODIMENT

Figure 1:
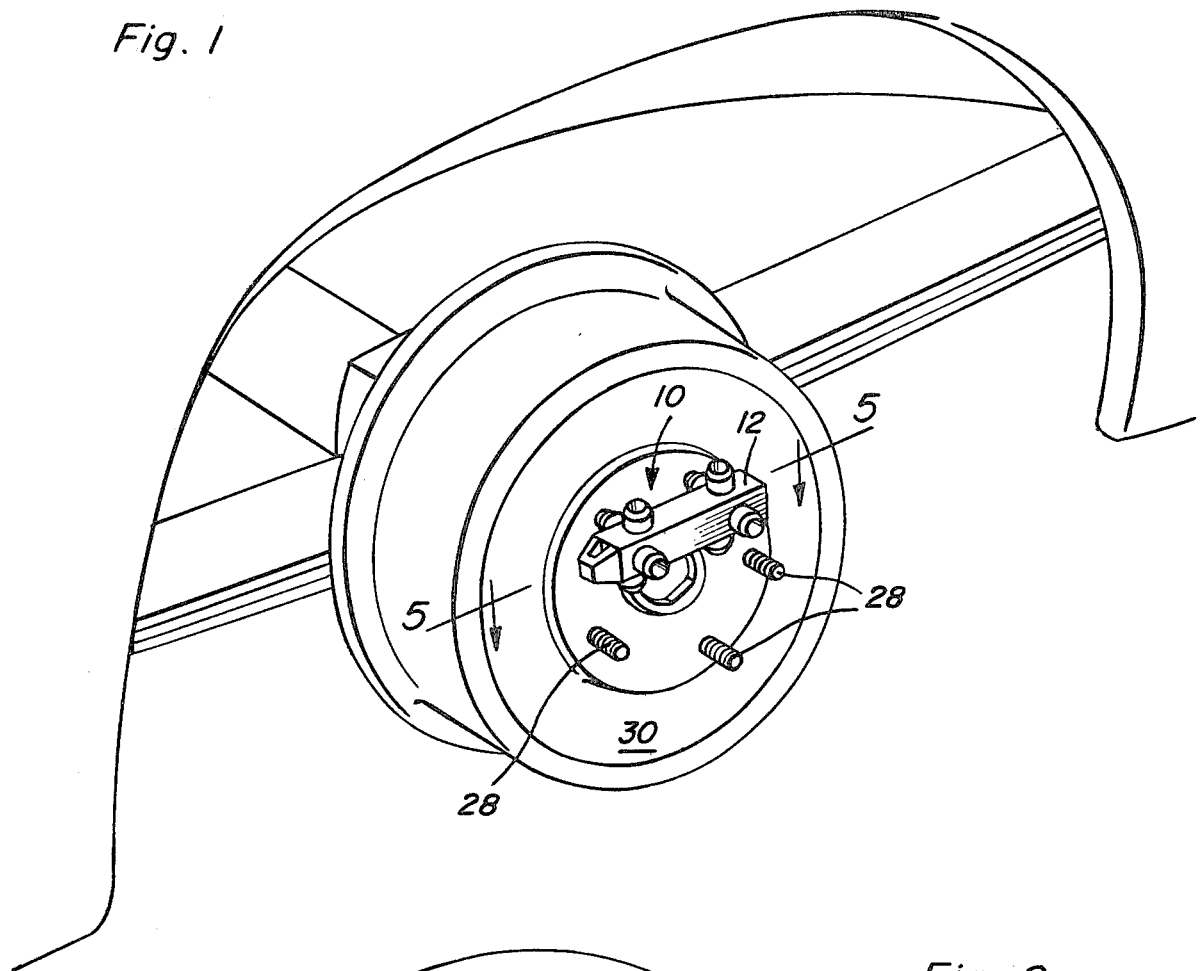
FIG. 1 is a perspective view of the bolt gauge attached to adjacent lugs on a hub.

Now with reference to the drawings, the bolt pattern gauge, generally referred to by the numeral 10 will be described in detail. The gauge has an elongated body 12 which has a geometric shape which is sufficient to accept a plurality of pairs of extensions 14 which protrude laterally from the body. As shown, the body has a generally square cross section and therefore will accommodate four pairs of extensions. However, it should be noted that a body having a cross section configured as a pentagon, hexagon, octagon, or the like, could be used to accommodate five, six, eight, or more pairs of extensions.

As can be clearly discerned from the drawings, each extension 14 comprises a generally cylindrical base portion 16 which terminates in a free end 18 having a generally frustro-conical shape. Each extension also has a hollow generally cylindrical center 20. The frusto-conical ends 18 may be fitted into mounting holes 22 of wheel 24, with each extension 14 being centered in a mounting hole by virtue of the conically shaped end or cylindrically shaped sides. Naturally, when two of the extensions are able to be centered in adjacent holes, the gauge may be read using the designations shown at 26 to determine the specifications of the bolt circle. If a pair of extensions will not fit in adjacent holes, the gauge may be rotated until the appropriate pair of extensions is located. Likewise, the bolt circle of the studs 28 attached to the brake drum 30 may be determined by inserting the studs into the cylindrical centers 20 of extensions 14. When two adjacent studs 28 fit within these centers, the bolt circle designation may be read from the gauge.

Formed integrally with the body 12 is an aperture 32 which serves as an opening from which the gauge may be hung for easy storage. Also, a rope or chain may be threaded through aperture 32 and several gauges 10 may be held together to provide a grouping of gauges sufficient to enable one to ascertain the bolt circle designation for any standard bolt pattern.

Figure 2:
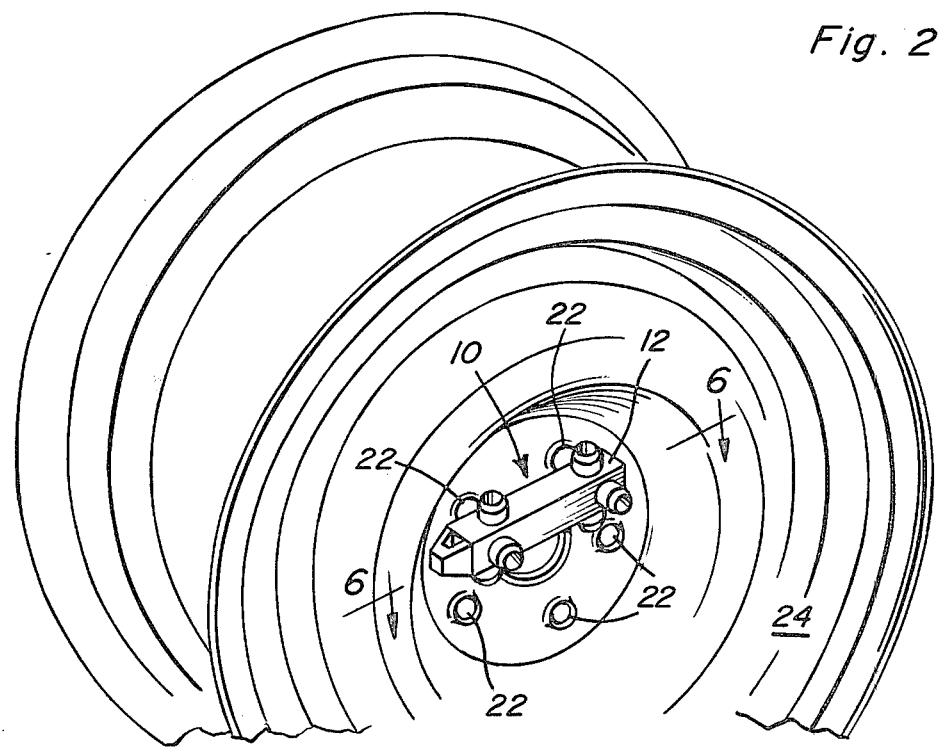
FIG. 2 is a perspective view of the bolt gauge inserted in adjacent mounting holes of a wheel.

Thus it can be seen that the bolt pattern gauge, whether it is made from metal, plastic, or any other suitable material, provides a simple and effective device for determining the bolt circle designation of mounting holes or studs for the mounting of wheels to vehicle hubs. A plurality of gauges may be employed and carried together for convenient access. Also, a plurality of extensions 14 may be mounted upon a single body for convenience, as discussed. Of course, when mounting such a plurality of extensions, it should be noted that the length of the body 12 should be sufficiently short to enable it to fit within the concaved area normally surrounding the mounting holes of a wheel, as seen in FIG. 2. This would indicate that the gauge should only be about as long as the diameter of the largest bolt circle to be measured thereby.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A bolt pattern gauge for accurately determining the distance between adjacent mounting holes on a vehicular wheel or adjacent studs on a hub of a vehicle, said gauge comprising an elongated body having a pair of laterally protruding extensions spaced longitudinally along said body, said extensions being adapted to engage adjacent wheel mounting studs on a vehicle and adapted to engage adjacent mounting holes on a vehicular wheel, each of said extensions including a free end insertable into one of said mounting holes and a hollowed interior for disposition over one of said studs.

2. The gauge of claim 1 wherein said free end has a generally frusto-conical configuration.

3. The gauge of claim 2 wherein said hollow interior has a generally cylindrical shape.

4. The gauge of claim 1 wherein said gauge includes markings proximate to said extensions, said markings being indicative of the bolt circle having adjacent elements with dimensions equal to the distance between said extensions.

5. The gauge of claim 4 wherein the length of said body is approximately equal to the diameter of the largest bolt circle to be measured by said gauge.

6. The gauge of claim 1 and further including a mounting aperture formed in said body for hanging the body from a hook or the like.

7. The device of claim 6 wherein a plurality of pairs of said extensions are mounted upon a single body.

8. The gauge of claim 1 wherein a plurality of said pairs of extensions are mounted on a single body.

9. A bolt pattern gauge for accurately determining the distance between mounting holes on a vehicular wheel or studs on the hub of a vehicle, said gauge comprising: an elongated body having a first measurement means comprising a first pair of surfaces spaced along said body by a predetermined distance equivalent to the distance between a pair of said studs for at least simultaneously partially surrounding said studs; a second measurement means comprising a second pair of surfaces spaced along said body by a predetermined distance equivalent to the distance between a pair of said mounting holes for being at least simultaneously partially inserted into said holes; and markings disposed proximate to said paired surfaces, said markings being indicative of a bolt circle diameter having adjacent elements with dimensions equal to the distance between said paired surfaces and the number of bolts in said circle.

10. The bolt pattern gauge of claim 9 wherein said first and second surfaces are formed on a pair of projections extending codirectionally from said elongated body.

* * * * *